April 1, 1930.                D. H. VAN HOVE                1,753,038
                         SLIDE WAY FOR WINDOW PANES
                            Filed July 12, 1928

INVENTOR
Desire H. VanHove
BY Chappell Earl
ATTORNEYS

Patented Apr. 1, 1930

1,753,038

UNITED STATES PATENT OFFICE

DESIRE H. VAN HOVE, OF ROYAL OAK, MICHIGAN

SLIDE-WAY FOR WINDOW PANES

Application filed July 12, 1928. Serial No. 292,092.

The main objects of this invention are to provide a slideway for window panes for automobile bodies and the like which is very effective in supporting the window against rattling, is adaptable for panes of different thickness and at the same time is economical in structure and very easily installed.

Objects relating to details and economies of my invention will appear from the description to follow. The invention is defined and pointed out in the claims.

A structure which is a preferred embodiment of my invention is illustrated in the accompanying drawing, in which.

In the drawing similar reference characters refer to similar parts throughout the several views.

In the accompanying drawing, 1 represents a vehicle body, 2 one of the doors having a window frame 3. 4 represents a pane of glass which is slidably supported in the frame. 5 represents one of the pillars or side elements of the window frame. This element 5 is longitudinally grooved at 6 and formed to provide a shoulder 7.

Figure 1:
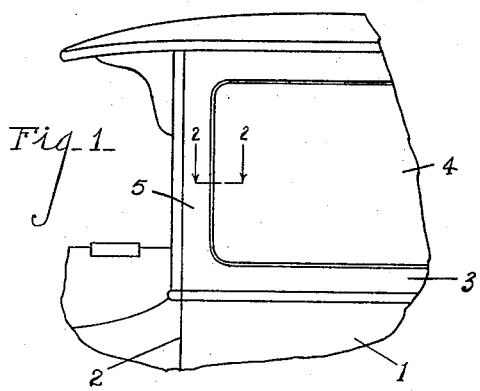
Fig. 1 is a fragmentary side elevation of an automobile body embodying my invention.
Figure 3:
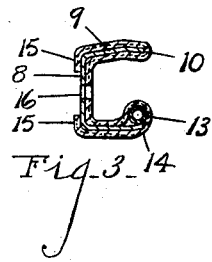
Fig. 3 is a transverse section through the slideway or guide element as prepared for installation in the frame.
Figure 2:
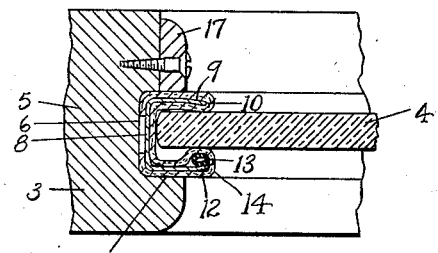
Fig. 2 is an enlarged detail horizontal section on line 2—2 of Fig. 1.
Figure 4:
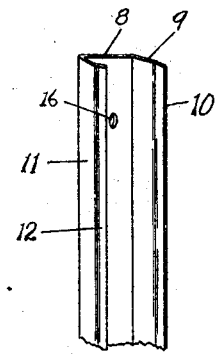
Fig. 4 is a detail front perspective view of the body member of the slideway or guide.
Figure 5:
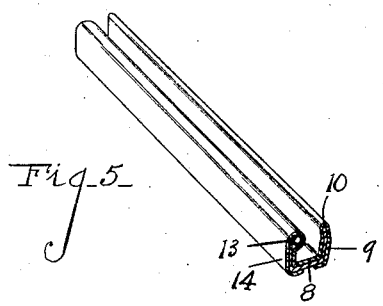
Fig. 5 is a fragmentary perspective view of the cushion and sealing element of the slideway.

My improved slideway comprises a body member 8 of channel cross section, the same being formed of sheet metal, one arm 9 having an inwardly directed edge 10, the other arm 11 having an inwardly directed edge 12. Within the inwardly directed edge 12 I arrange a tubular rubber cushion member 13 which is retained in position by the covering 14 preferably of felt. This covering 14 is fitted within the body member and is lapped over the outer sides thereof with its edges 15 overlapping the web of the body member and clamped thereby in the groove 6, the slideway being retained by screws arranged through holes 16 provided in the web of the body member and also by the finishing strip 17 which engages the inner arm of the slideway—see Fig. 2.

The tubular rubber cushion element 13 is supported in the edge of the outer arm of the slideway and so that the pane 4 is yieldingly supported between this cushion and the opposite edge of the slideway which, owing to the edge 10 being directed inwardly, presents a relatively restricted bearing surface to the pane so that while it is quite firmly engaged between these opposed portions of the slideway, it may be moved quite easily.

The body member is preferably formed of bendable sheet metal material so that it may be adjusted to the pane and is effectively supported in its adjusted position by means of the finishing strip. However, the resilient cushion adapts the guide strip to a very considerable variation in the thickness of the glass.

A further advantage is that the slideway is not materially affected by weather conditions, that is, it does not shrink or expand.

I have not attempted to illustrate and describe various adaptations or modifications which I contemplate as it is believed that the disclosure made will enable those skilled in the art to embody or adapt my improvements as may be desired.

Having thus described my invention, what I claim as new and desire to secure by Letters Patent, is:

1. A slideway for a window pane comprising a sheet metal body of channel cross section, the outer edges of the arms of said body member being directed inwardly, a tubular rubber cushion disposed longitudinally on the inner side of one arm of said body member against the inwardly directed portion at its outer edge, and a felt covering for said body member arranged over said cushion member, the edges of said covering being folded rearwardly over the outer side of the arms of said body member and lapped upon the web thereof.

2. A slideway for a window pane comprising a sheet metal body of channel cross section, a cushion disposed longitudinally on the inner side of one arm of said body member, and a felt covering for said body member arranged over said cushion member.

In witness whereof I have hereunto set my hand.

DESIRE H. VAN HOVE.